(12) United States Patent
Suzuki

(10) Patent No.: US 8,390,903 B2
(45) Date of Patent: Mar. 5, 2013

(54) IMAGE READING APPARATUS

(75) Inventor: Nobuhiko Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 508 days.

(21) Appl. No.: 12/732,743

(22) Filed: Mar. 26, 2010

(65) Prior Publication Data

US 2010/0302605 A1 Dec. 2, 2010

(30) Foreign Application Priority Data

Jun. 1, 2009 (JP) ................. 2009-132478

(51) Int. Cl.
*H04N 1/04* (2006.01)
*H04N 1/00* (2006.01)
(52) U.S. Cl. ........................ 358/474; 358/401
(58) Field of Classification Search .................. None
See application file for complete search history.

(56) References Cited

U.S. PATENT DOCUMENTS

2008/0252941 A1* 10/2008 Hashizume .................. 358/474
2008/0266617 A1* 10/2008 Suzuki ........................ 358/474

FOREIGN PATENT DOCUMENTS

| JP | 09-022071 | | 1/1997 |
|---|---|---|---|
| JP | 09-116702 | | 5/1997 |
| JP | 2000-287036 | | 10/2000 |
| JP | 2003-046774 | A | 2/2003 |
| JP | 2002-111982 | A | 4/2004 |
| JP | 2004-272415 | A | 9/2004 |
| JP | 2007-081696 | A | 3/2007 |

OTHER PUBLICATIONS

JP Office Action dtd Mar. 15, 2011, JP App. 2009-132478, English Translation.

* cited by examiner

*Primary Examiner* — Douglas Tran
(74) *Attorney, Agent, or Firm* — Banner & Witcoff, Ltd.

(57) ABSTRACT

An image reading apparatus includes: a reading unit outputting an output value based on reflection light from a sheet or a reference member; a white reference value generating unit generating a group of white reference values based on the output value under one of the plurality of reading conditions while the light source unit is turned on; a white reference value storing unit; a white reference value converting unit converting the group of white reference values into a group of white reference values of a different reading condition based on a correlation between the reading condition and the different reading condition; a sheet reading control unit controlling the reading unit to read the sheet while turning the light source unit on with the luminosity and lighting time stored in the white reference value storing unit; and a shading correcting unit performing a shading correction for the output value.

13 Claims, 13 Drawing Sheets

FIG. 3

| READING CONDITION | | SUBTRACTION COEFFICIENT | AFE AMPLIFICATION RATE INITIAL VALUE | AFE AMPLIFICATION RATE STORAGE VALUE |
|---|---|---|---|---|
| LINE CYCLE | RESOLUTION | | | |
| 1msec | 300dpi | 4 | ONE TIME | STORED BY BRIGHTNESS ADJUSTMENT |
| 2msec | 600dpi | 2 | 1.5 TIMES | STORED BY BRIGHTNESS ADJUSTMENT |
| 4msec | 1200dpi | 1 | THREE TIMES | STORED BY BRIGHTNESS ADJUSTMENT |

FIG. 10

| READING CONDITION | | SUBTRACTION COEFFICIENT | OUTPUT LEVEL CONVERSION COEFFICIENT | PLUS REFERENCE VOLTAGE INITIAL VALUE | PLUS REFERENCE VOLTAGE STORAGE VALUE |
|---|---|---|---|---|---|
| LINE CYCLE | RESOLUTION | | | | |
| 1msec | 300dpi | 4 | 3 | 1.7V | STORAGE BY BRIGHTNESS ADJUSTMENT |
| 2msec | 600dpi | 2 | 1.5 | 1.4V | STORAGE BY BRIGHTNESS ADJUSTMENT |
| 4msec | 1200dpi | 1 | 1 | 1.1V | STORAGE BY BRIGHTNESS ADJUSTMENT |

FIG. 13A

| READING CONDITION | | GROUP 1 | GROUP 2 |
|---|---|---|---|
| LINE CYCLE | RESOLUTION | | |
| 1msec | 300dpi | Ⓐ | Ⓐ |
| 2msec | 300dpi | B | A |
| 2msec | 600dpi | Ⓑ | Ⓑ |
| 4msec | 600dpi | C | B |
| 6msec | 1200dpi | Ⓒ | Ⓒ |

FIG. 13B

| READING CONDITION | | | GROUP 3 |
|---|---|---|---|
| LINE CYCLE | RESOLUTION | GRAY SCALE | |
| 1msec | 300dpi | 8bit | A |
| 2msec | 300dpi | 16bit | Ⓐ |
| 2msec | 600dpi | 8bit | B |
| 4msec | 600dpi | 16bit | Ⓑ |

FIG. 13C

| READING CONDITION | | | GROUP 4 | GROUP 5 |
|---|---|---|---|---|
| MONOCHROME/ MULTICOLOR | LINE CYCLE | RESOLUTION | | |
| MONOCHROME | 1msec | 300dpi | A | A |
| MONOCHROME | 2msec | 600dpi | B | Ⓐ |
| MONOCHROME | 4msec | 1200dpi | C | A |
| MULTICOLOR | 3msec | 300dpi | Ⓐ | B |
| MULTICOLOR | 6msec | 600dpi | Ⓑ | Ⓑ |
| MULTICOLOR | 12msec | 1200dpi | Ⓒ | B |

IMAGE READING APPARATUS

CROSS-REFERENCE TO RELATED APPLICATIONS

This application claims priority of Japanese Patent Application No. 2009-132478 filed on Jun. 1, 2009, the entire subject matter of which is incorporated herein by reference.

BACKGROUND

Technical Field

The present invention relates to an image reading apparatus.

SUMMARY

An image reading apparatus, which reads a sheet with the same amount of light for each reading condition, which converts a white reference value generated under one reading condition into a white reference value of a different reading condition, and which uses the white reference value of the different reading condition in order to perform a shading correction for an output value obtained by reading the sheet under the different reading condition.

BRIEF DESCRIPTION OF THE DRAWINGS

FIG. 3 is a schematic view showing an example of reading conditions for reading a sheet;

FIG. 10 is a schematic view showing an example of reading conditions according to a second exemplary embodiment;

FIGS. 13A to 13C are tables each showing an example of groups of reading conditions according to a fourth exemplary embodiment.

DETAILED DESCRIPTION

<General Overview>

Figure 1:
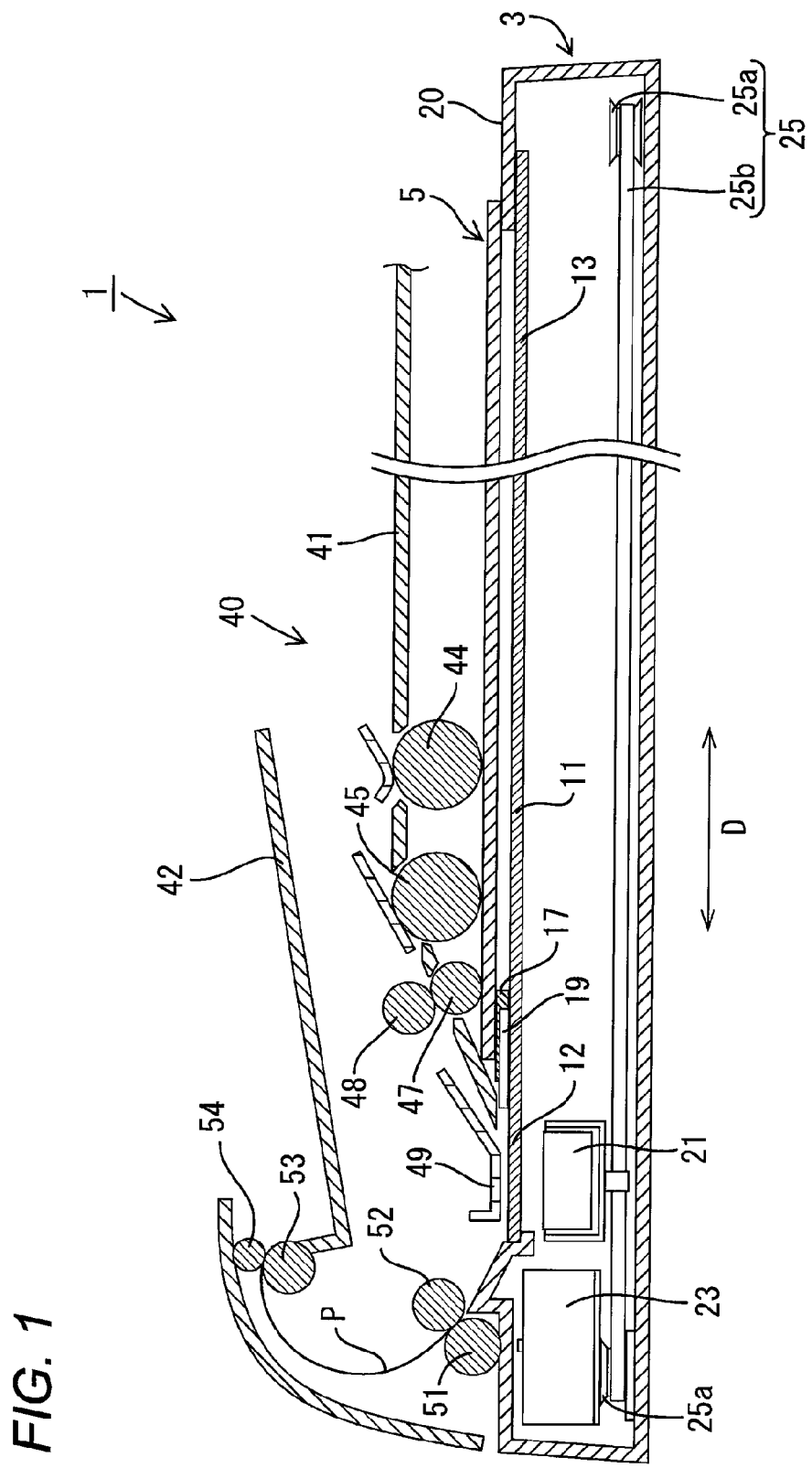
FIG. 1 is a schematic view of an image reading apparatus according to a first exemplary embodiment of the present invention.

According to one aspect of the present invention, there is provided an image reading apparatus that reads an image of a sheet under one of a plurality of reading conditions, the image reading apparatus comprising: a reference member; a light source unit that emits light to the sheet or the reference member; a reading unit that outputs an output value based on reflection light from the sheet or the reference member; a light intensity adjusting unit that adjusts at least one of luminosity and lighting time of the light source unit such that the output value from the reading unit reaches a predetermined value; a white reference value generating unit that generates a group of white reference values based on the output value from the reading unit under one of the plurality of reading conditions in a state where the light source unit is turned on with the luminosity and lighting time adjusted by the light intensity adjusting unit; a white reference value storing unit that stores the group of white reference values generated by the white reference value generating unit and the luminosity and lighting time adjusted by the light intensity adjusting unit; a white reference value converting unit that converts the group of white reference values stored in the white reference value storing unit into a group of white reference values of a different reading condition based on a correlation between the reading condition under which the group of white reference values is generated by the white reference value generating unit and the different reading condition; a sheet reading control unit that controls the reading unit to read the sheet while turning the light source unit on with the luminosity and lighting time stored in the white reference value storing unit when the image of the sheet is read under the one of the plurality of reading conditions; and a shading correcting unit that performs a shading correction for the output value output from the reading unit, wherein, if the one reading condition is the reading condition with which the group of white reference values is generated, the shading correcting unit performs the shading correction by using the group of white reference values that are stored in the white reference value storing unit, and wherein, if the one reading condition is a reading condition other than the reading condition with which the group of white reference values is generated, the shading correcting unit performs the shading correction by using the group of white reference values that are converted by the white reference value converting unit.

According to the aspect of the invention, the luminosity and lighting time of the light source unit, which are adjusted with one reading condition, are also used for reading for a different reading condition. Further, white reference values are prepared under one of a plurality of reading conditions, and white reference values of a different reading condition are obtained by converting the white reference values based on a correlation between the reading condition, with which the white reference values are generated, and the different reading condition. Thus, there is no need to adjust the light intensity for each reading condition to obtain white reference values corresponding to the adjusted light intensity. Therefore, it is possible to reduce waiting time before starting a reading operation compared to the related art.

In addition, according to the aspect of the invention, the luminosity and lighting time adjusted for one reading condition and the group of white reference values generated by the white reference value generating unit are stored. Thus, it is not necessary to store the luminosity, lighting time and group of white reference values adjusted for each reading condition. Therefore, memory capacity can be reduced.

<Exemplary Embodiments>

Exemplary embodiments of the present invention will now be described with reference to the drawings.

(First Exemplary Embodiment)

Referring to FIGS. 1 to 9, a first exemplary embodiment of the present invention will be described.

(1) Configuration of Multi-Function Device

As shown in FIG. 1, an image scanner 1 (one example of an image reading apparatus) is a so-called flat bed type scanning apparatus. The image scanner includes an apparatus body 3 and a FB cover 5. The apparatus body includes a platen glass 13, on which a sheet is placed. The FB cover 5 is openable and closable with respect to the apparatus body 3.

The apparatus body 3 includes: the platen glass 13 including a first reading plane 11 and a second reading plane 12; a housing 20 that supports the platen glass 13; a positioning member 17 that positions the sheet placed on the first reading plane 11; a white reference plate 19 having a predetermined reflectivity; a reading device 21; a FB motor 23 that moves the reading device 21; and a belt mechanism 25.

A surface of the platen glass 13 is partitioned into the first reading plane 11 and the second reading plane 12 by the positioning member 17. The positioning member 17 is detachably attached to the housing 20. The first reading plane 11 is an area for reading the sheet placed on a surface thereof by a user. The first reading plane 11 is covered by the FB cover 5 under a state where the FB cover 5 is closed. The second reading plane 12 is an area for reading a sheet P conveyed by a sheet conveying device 40, which is arranged on the FB cover 5.

The reading device 21 (one example of a reading unit) is accommodated in the rear side of the platen glass 13 such that the device is movable in a sub scan direction (D direction in the figure) parallel to the face of the platen glass 13. The reading device 21 is fixed to a belt 25b caught by a pair of rollers 25a provided in the belt mechanism 25 and moves in the sub scan direction along with the belt 25b rotated by power generated by the FB motor 23.

The white reference plate 19 (one example of a reference member) is interposed between the positioning member 17 and the platen glass 13, extending in a main scan direction perpendicular to the sheet. The white reference plate 19 is a white member having a high reflectivity and is used to generate a group of white reference values (a set of white reference values) for adjustment of light intensity of a light source (see FIG. 2) or shading correction.

Upon reading the sheet P conveyed onto the second reading plane 12 by the operation of the sheet conveying device 40 arranged on the FB cover 5, the reading device 21 moves beneath the second reading plane 12 and then stops. In addition, upon reading the sheet on the first reading plane 11, the reading device 21 is carried in the sub scan direction along the rear side of the first reading plane 11 by the operation of the FB motor 23 and the belt mechanism 25.

The sheet conveying device 40 arranged on the FB cover 5 as described above performs the following operations: conveying the sheet P placed on a sheet feeding tray 41 onto the second reading plane 12 and discharging the sheet read on the second reading plane by the reading device 21 to a sheet discharge tray 42.

The sheet conveying device 40 includes sheet feeding rollers 44 and 45 at a starting point of a conveying path. A sheet placed on the sheet feeding tray 41 is conveyed in the downstream of the conveying path by the sheet feeding rollers 44 and 45. The sheet P conveyed by the sheet feeding rollers 44 and 45 is further conveyed in the downstream of the conveying path by conveying rollers 47 and 48.

In the conveying path, an upper plate 49 having a gap with the second reading plane 12 and facing the second reading plane 12 is arranged at a downstream side further away from the conveying rollers 47 and 48. The sheet P conveyed by the conveying rollers 47 and 48 passes between the upper plate 49 and the second reading plane 12, thenceforth is again conveyed by a pair of conveying rollers 51 and 52 provided in the downstream of the conveying path. Subsequently, the sheet P is discharged to the sheet discharge tray 42 by a pair of sheet discharging rollers 53 and 54.

(2) Electrical Configuration of Image Scanner

Figure 2:
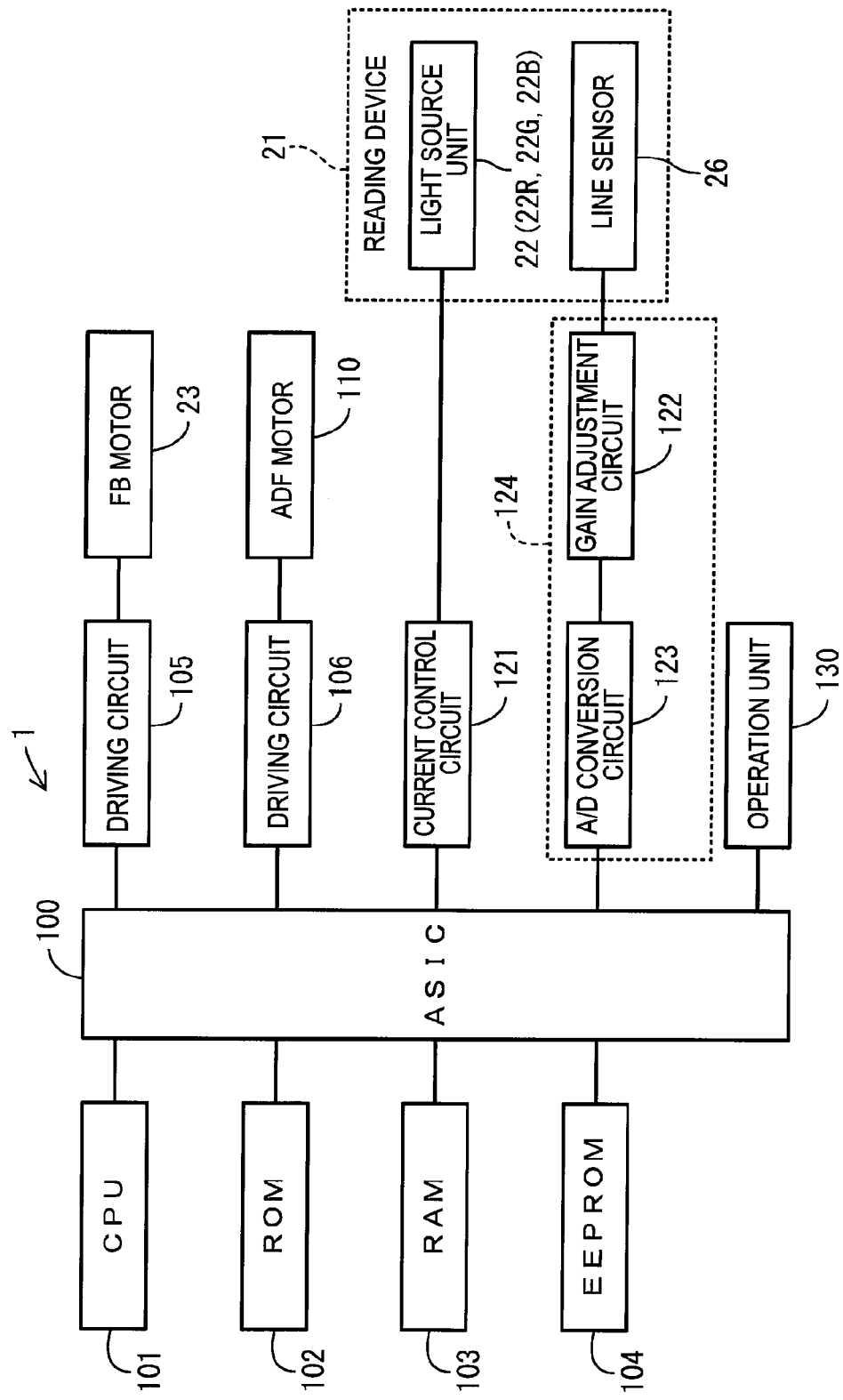
FIG. 2 is a block diagram showing an electrical configuration of the image reading apparatus.

As shown in FIG. 2, the image scanner 1 includes an ASIC 100, a CPU 101, a ROM 102, a RAM 103, an EEPROM 104 (one example of a white reference value storing unit and a conversion parameter storing unit), the FB motor 23, a FB motor driving circuit 105, an ADF motor 110, an ADF motor driving circuit 106, the reading device 21, a current control circuit 121, an Analog Front End (AFE) 124 (one example of a converting unit), an operation unit 130, etc.

As shown in FIG. 2, the FB motor driving circuit 105, the ADF motor driving circuit 106, the current control circuit 121, the converting unit 124, the operation unit 130, etc, are connected to the ASIC 100 (one example of a shading correcting unit). The ASIC 100 controls these components under control of the CPU 101 and performs various image processes, including a gamma correction, a shading correction and so on, for an output value (pixel value) output from the converting unit 124, thereby generating image data having, for example, 3 pixel values of RGB for each pixel.

Alternatively, the various image processes including a gamma correction, a shading correction and so on may be performed by the CPU 101 instead of the ASIC 100.

The reading device 21 includes a line sensor 26 and a light source unit 22. The line sensor 26 includes a plurality of light receiving elements arranged in a line in the main scan direction. The light source unit 22 includes: light sources 22R having a plurality of red (R) LEDs arranged in a line in an extension direction of the line sensor 26; light sources 22G having a plurality of green (G) LEDs arranged in a line; and light sources 22B having a plurality of blue (B) LEDs arranged in a line. The light sources 22R, 22G and 22B emit light with luminosity (or brightness) that is varied depending on the magnitude of a current supplied from the current control circuit 121. The reading device 21 outputs an output value (a voltage corresponding to charges accumulated in each light receiving element) based on reflection light from the sheet or the white reference plate 19 by emitting light from the light source unit 22.

The light source unit 22 of the reading device 21 is connected to the current control circuit 121. The current control circuit 121 supplies a current to the light source unit 22 based on a PWM signal output as a pulse signal from the ASIC 100.

The CPU 101 (one example of a light intensity adjusting unit, white reference value generating unit, white reference value converting unit, sheet reading control unit and conversion parameter adjusting unit) can adjust the magnitude of the current supplied to the light sources 22R, 22G and 22B by adjusting a duty ratio (LEDPWM adjustment value) of pulse width to pulse cycle of the PWM signal for each color of the light source unit 22 through the ASIC 100.

The CPU 101 adjusts a duty ratio (LEDDUTY adjustment value) of a period in which the PWM signal is output to a period in which the PWM signal is not output in one line cycle for each of the light sources 22R, 22G and 22B through the ASIC 100 so as to adjust lighting time for each of the light sources 22R, 22G and 22B.

Alternatively, the adjustment of the luminosity and lighting time of the light source unit 22 and the adjustment of the conversion parameter may be performed by the ASIC 100 instead of the CPU 101.

The AFE 124 includes a gain adjustment circuit 122 and an A/D conversion circuit 123 and converts an analog output value (voltage) output from the line sensor 26 into a digital output value (pixel value).

The gain adjustment circuit 122 (one example of a amplifying unit) is a circuit for adjusting a gain of a voltage output from the reading device 21. The gain adjustment refers to a process of amplifying the voltage with a predetermined amplification rate. An amplification rate (AFE amplification rate) may be set in the gain adjustment circuit 122 and the AFE 122 amplifies a voltage with the set AFE amplification rate (one example of a conversion parameter).

The A/D conversion circuit 123 (one example of a converting unit and A/D converting unit) is a circuit for converting the voltage amplified by the gain adjustment circuit 122 into a digital output value (pixel value). In the first exemplary embodiment, the A/D conversion circuit 123 has the ability to resolve a voltage range into 8 bits (0 to 255). The A/D conversion circuit 123 includes: a register (one example of a reference voltage variable unit) that sets a lower limit value (referred to as "AFE offset") of a voltage to be converted into a pixel value from the outside; and a register (one example of a reference voltage variable unit) that sets an upper limit value (referred to as "plus reference value") of the voltage to be converted into the pixel value from the outside. The A/D conversion circuit 123 converts a voltage less than the lower limit value into 0 (zero) at all times. In contrast, the A/D conversion circuit 123 converts a voltage more than the upper limit value into 255 at all times. The A/D conversion circuit 123 converts a voltage lying between the lower limit value and the upper limit value into a pixel value corresponding to a value of the voltage.

The operation unit 130 (a selecting unit) is provided in the front of the apparatus body 3. The operation unit 130 includes various operation switches. The operation unit 130 allows a user to input various instructions such as a reading instruction to the image reader 1 or to set various settings such as reading conditions of the image reader 1.

(3) Reading Conditions

FIG. 3 is a table showing an example of reading conditions. Reading conditions refer to a set of various setting values related to reading of a sheet. Specifically, a setting value refers to, for example, a line cycle (information on one line cycle and the lightable time of the light source unit 22 in the one line cycle), a resolution, a subtraction coefficient, an AFE amplification rate initial value, an AFE amplification rate storage value, etc. These setting values are merely examples but, alternatively, the reading conditions may include other setting values such as the number of colors of the light source unit (monochrome/multicolor, etc) and the like.

Figure 4:
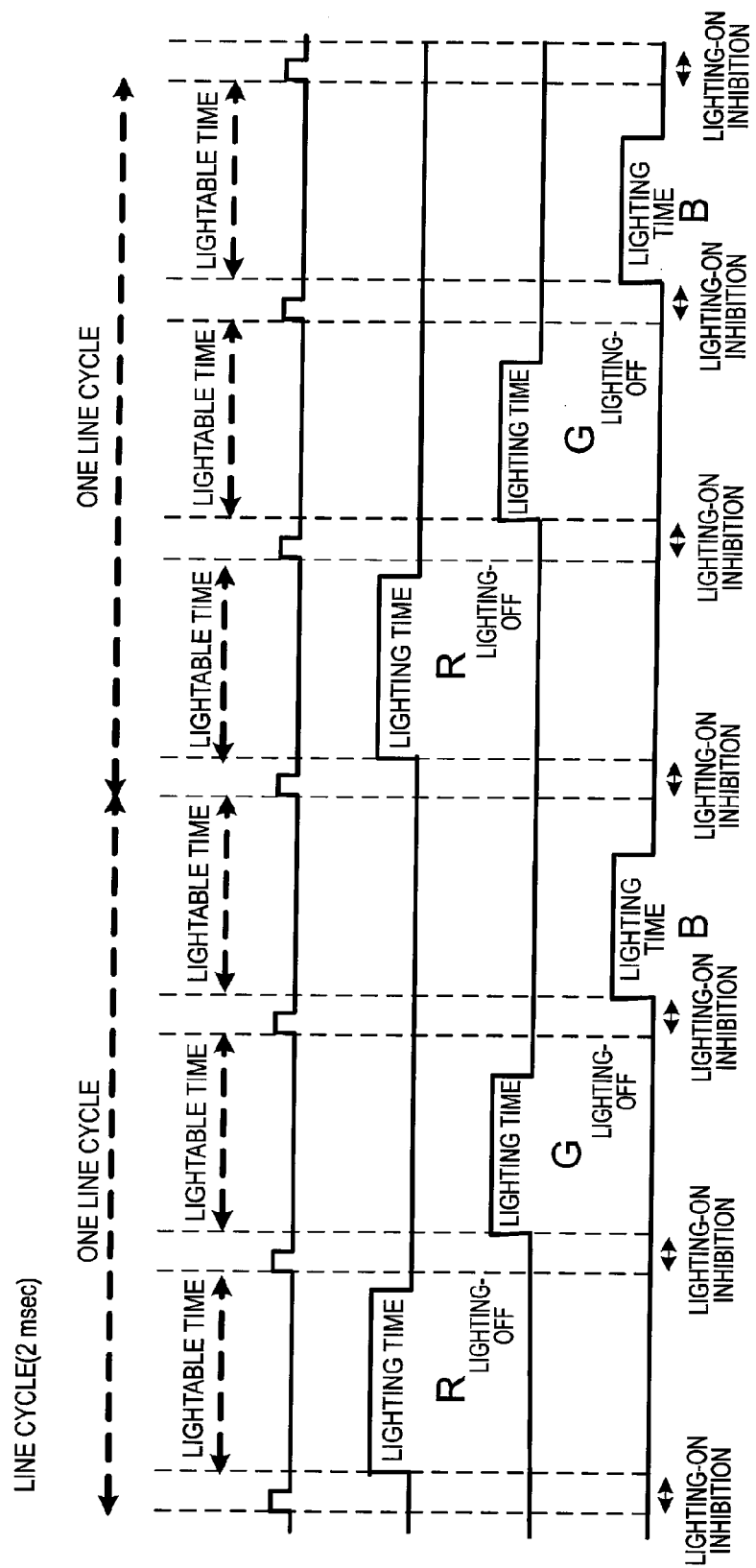
FIG. 4 is a timing chart for explaining a line period, lightable time and lighting time.

FIG. 4 shows one line cycle of 2 msec (milliseconds).

One line cycle refers to a time for which each RGB for multicolor or one color for monochrome is output as an output value of each light receiving element in the main scan direction. The CPU 101 controls the reading device 21 to read one line of the sheet in color by lighting on the light sources 22R, 22G and 22B one by one for the time.

The lightable time refers to the longest time for which the light source unit 22 of one color can be lighted on within one line cycle.

The lighting time refers to the time for which the light source unit 22 is actually lighted within the lightable time. The lighting time is adjusted for each color of the light source unit 22 within the lightable time.

Returning to FIG. 3, the resolution refers to the number of pixels per one inch when the sheet is read. In the first exemplary embodiment, one of 300 dpi, 600 dpi and 1200 dpi is set as the resolution.

The subtraction coefficient (one example of a correlation) refers to a resolution ratio obtained by dividing the maximum resolution (1200 dpi in the first exemplary embodiment) in a plurality of reading conditions by a resolution of each reading condition. The subtraction coefficient is used when a group of white reference values generated under a reading condition including the maximum resolution is converted into a group of white reference values of a different reading condition.

The AFE amplification rate initial value is used when the AFE amplification rate is adjusted for each reading condition by brightness adjustment (which will be described later).

The AFE amplification rate storage value is an AFE amplification rate adjusted by the brightness adjustment (which will be described later). The AFE amplification rate storage value is used when a voltage output from the reading device 21 is amplified.

(4) Relationship Between Resolution and Voltage of One Pixel of Image Data

The reading device 21 is configured such that a voltage of one pixel output by reading the sheet is varied depending on the resolution.

More specifically, the reading device 21 receives light in all light receiving elements when any resolution is selected. For example, if 1200 dpi is selected, the reading device 21 outputs a voltage corresponding to charges accumulated in one light receiving element as the voltage of one pixel of image data. As another example, if 600 dpi is selected, the reading device 21 outputs a voltage corresponding to an aggregate of charges (aggregate charge) accumulated in two light receiving elements as the voltage of one pixel of image data. As a further example, if 300 dpi is selected, the reading device 21 outputs a voltage corresponding to an aggregate of charges (aggregate charge) accumulated in four light receiving elements as the voltage of one pixel of image data.

Accordingly, assuming that the sheet is read with the same luminosity and lighting time of the light source unit 22 for each resolution, the quantity of charges accumulated in one light receiving element is the same for any resolution. Therefore, the voltage of one pixel when the sheet is read with the resolution of 600 dpi amounts to about double the voltage of one pixel when the sheet is read with the resolution of 1200 dpi. Likewise, the voltage of one pixel when the sheet is read with the resolution of 300 dpi amounts to about four times the voltage of one pixel when the sheet is read with the resolution of 1200 dpi.

Accordingly, in the related art, the luminosity of the light source unit 22 has been changed for each resolution in order to output voltage having the same magnitude when the sheet is read with any resolution. For example, the luminosity of the light source unit 22 when the sheet is read with the resolution of 1200 dpi was four times the luminosity of the light source unit 22 when the sheet is read with the resolution of 300 dpi.

(5) Outline of Process of Image Scanner

Figure 5:
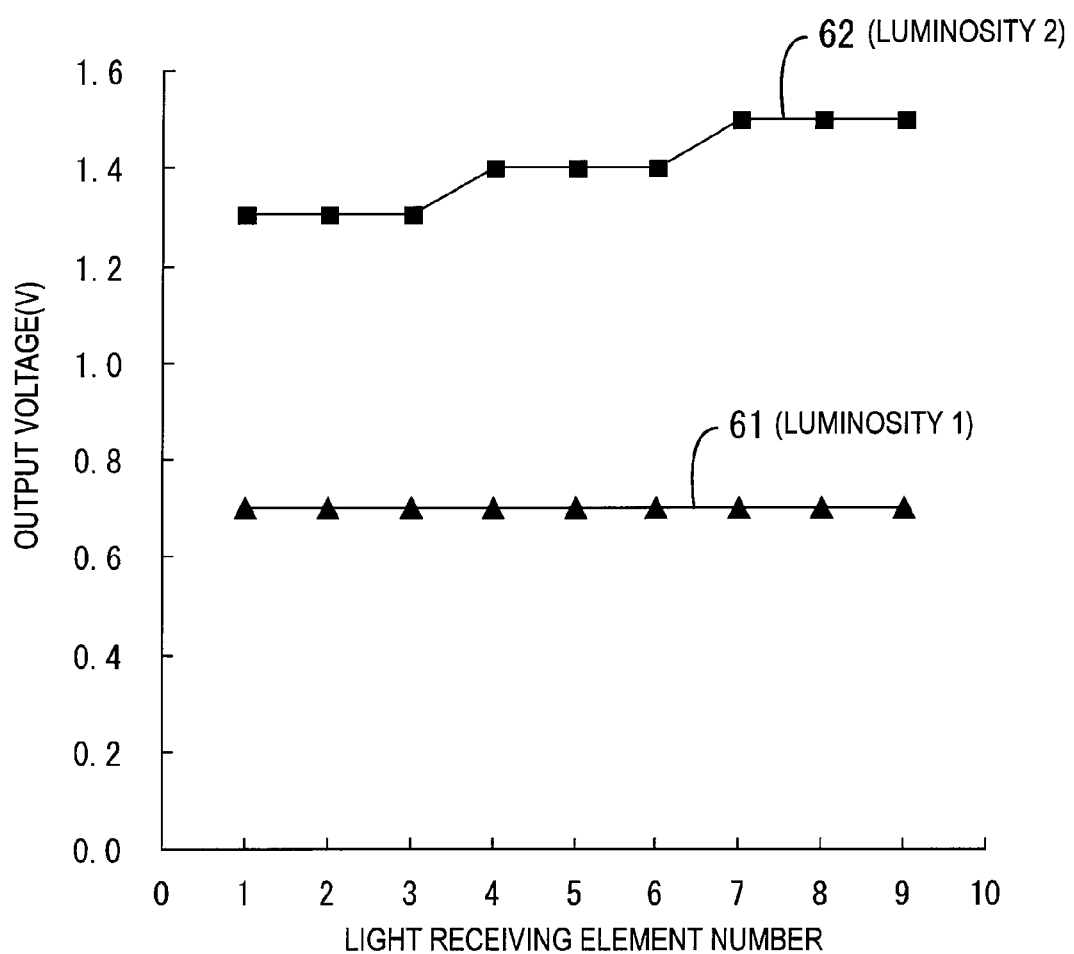
FIG. 5 is a graph for explaining a relationship between luminosity of a light source and non-uniformity of sensitivity of a light receiving element.

FIG. 5 shows a distribution of output voltages for each light receiving element when one line of the white reference plate 19 is read with lower luminosity 1 and higher luminosity 2. In this figure, a solid line 61 represents a distribution of output voltages for luminosity 1 and a solid line 62 represents a distribution of output voltages for luminosity 2.

In the shown example, voltages between light receiving elements are substantially uniform for luminosity, while being non-uniform for luminosity 2. In other words, the distribution of output voltages when the white reference plate 19 is read, namely, non-uniformity of sensitivity between the light receiving elements, is varied depending on the luminosity of the light source unit 22.

When the non-uniformity of outputs between the light receiving elements is varied depending on the luminosity, the group of white reference values generated by reading the white reference plate 19 with luminosity 1 cannot be utilized for the shading correction of the output value (pixel value) output, for example, by reading the sheet with luminosity 2. In other words, when the non-uniformity of outputs between the light receiving elements when the group of white reference values is different from the non-uniformity of outputs between the light receiving elements when the sheet is read, the group of white reference values cannot be utilized.

That is, if the brightness of the light source unit 22 when the sheet is read is varied depending on the reading conditions, a group of white reference values generated under one reading condition cannot be utilized for the shading correction of an output value (pixel value) read under a different reading condition.

On the contrary, when the sheet is read with the same light intensity adjustment value (a current value supplied to the light source unit 22 and the lighting time) for all reading conditions, since the non-uniformity of outputs between the light receiving elements is not different when the sheet is read under any reading condition, a group of white reference values generated under one reading condition can be utilized for the shading correction of an output value (pixel value) read under a different reading condition. That is, it is possible to utilize the group of white reference values for any reading condition.

Thus, in the first exemplary embodiment, a group of white reference values is generated for the maximum resolution (1200 dpi) and, when the sheet is read with a different resolution, the sheet is read with the same light intensity adjustment value as when the group of white reference values is generated with the maximum resolution by turning the light source unit 22 on. In addition, when the output value (pixel value) output by reading the sheet with the different resolution is shading-corrected, the group of white reference values generated with the maximum resolution is converted into the group of white reference values of the different resolution based on a correlation (subtraction coefficient) between the maximum resolution and the different resolution, and then the shading correction is performed using the converted group of white reference values. That is, the group of white reference values is utilized by equalizing light intensity adjustment values of the light source unit 22 between the resolutions.

The reason why a group of white reference values is generated with the maximum resolution is that, as the number of white reference values becomes maximal for the maximum resolution, the generated group of white reference values can be converted into a group of white reference values of a different resolution by subtracting or averaging the generated group of white reference values.

However, if the sheet is read with the same light intensity adjustment value for all resolutions, when the sheet is read with a resolution higher than the minimum resolution (300 dpi in the first exemplary embodiment), an output value (voltage) becomes smaller than that for the minimum resolution (300 dpi). The reason for this was as described in "(4) Relationship between Resolution and Voltage of One Pixel of Image Data."

Thus, in the first exemplary embodiment, by adjusting an AFE amplification rate (conversion parameter) for each resolution, a voltage is amplified in such a manner that, when the sheet is read with any resolution, an output value (pixel value) having the same magnitude as the output value (pixel value) obtained when the sheet is read with the minimum resolution is output. This can make the output values (pixel values) equal to each other when the sheet is read with any resolution. In the first exemplary embodiment, adjusting a conversion parameter for each resolution is referred to as "brightness adjustment."

(6) Details of Process of Image Scanner

Hereinafter, details of a process of the image scanner 1 will be described with the process divided into a "pre-processing before reading of a sheet" and a "sheet reading process."

(6-1) Pre-processing Before Reading of Sheet

The image scanner 1 performs a pre-processing, such as light intensity adjustment of the light source unit 22, brightness adjustment, generation of a shading correction value for the maximum resolution, or the like, at a predetermined timing before a sheet is read.

Specifically, the predetermined timing before a sheet is read refers to at least one of, for example, (i) a timing when the image scanner 1 is powered on, a timing when a predetermined period of time elapses after the light intensity of the light source unit 22 is previously adjusted, (ii) a timing when the image scanner 1 reads the predetermined number of sheets or more, and (iii) a timing when the current temperature is out of a certain range as compared to the temperature of the light source unit 22 when the light intensity is adjusted.

(6-1-1) Overall Flow of Pre-processing

Figure 6:
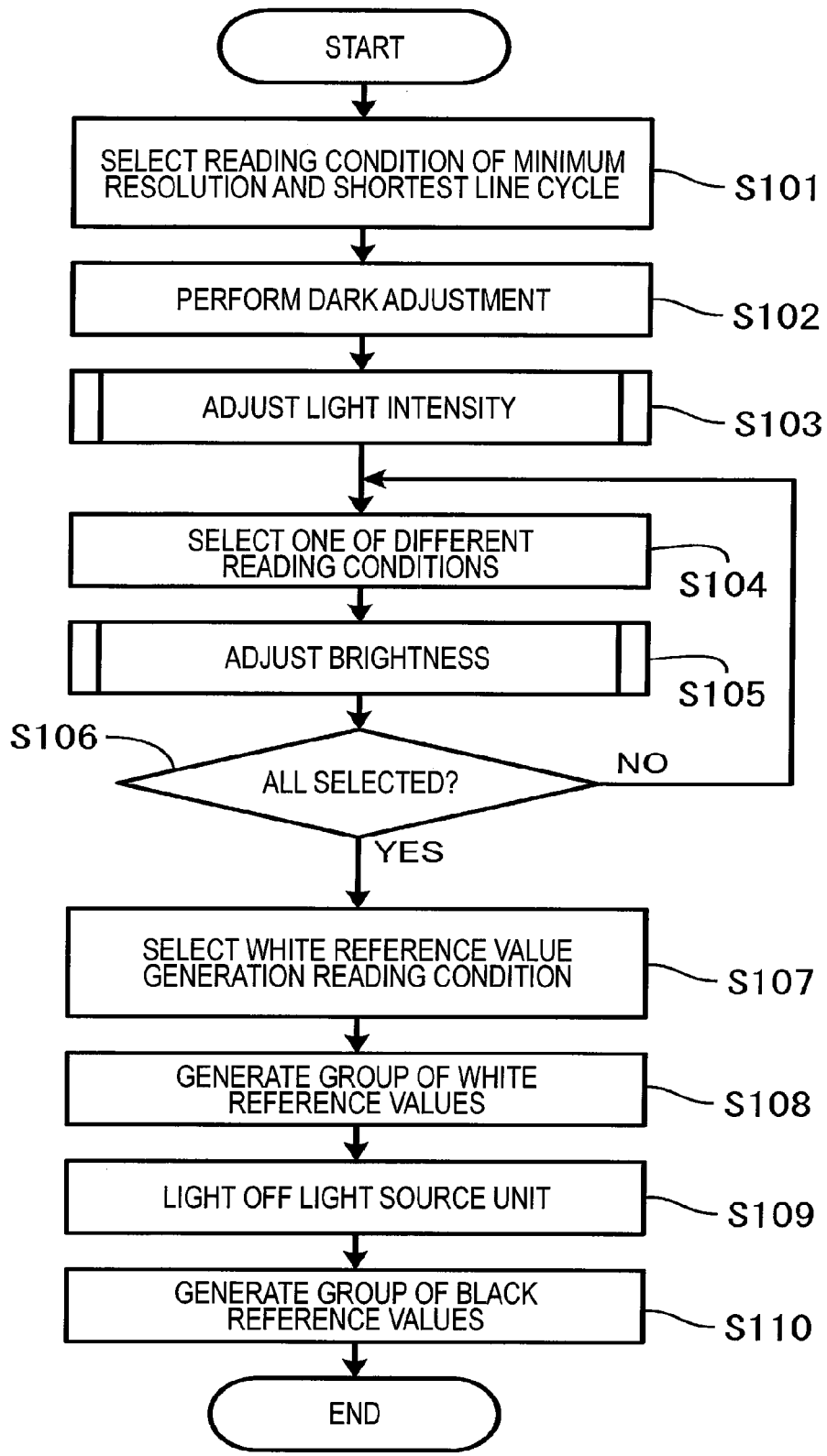
FIG. 6 is a flow chart showing entire flow of a pre-processing.

In FIG. 6, in S101, the CPU 101 selects one of the reading conditions shown in FIG. 3 including a resolution (the minimum resolution of 300 dpi in the first exemplary embodiment) giving the highest voltage of one pixel output by the reading device 21 when the light source unit 22 emits light with the same light intensity for a plurality of reading conditions.

The reason for the selection of the reading condition including the resolution (300 dpi) giving the highest voltage of one pixel is that, when the light intensity adjustment value (current value supplied to the light source unit 22 and lighting time) of the light source unit 22 is adjusted such that an output value (pixel value) obtained when the white reference plate 19 is read with the resolution giving the highest voltage of one pixel does not overflow, a pixel value does not overflow even when the sheet is read with the same light intensity adjustment value for different resolutions. The overflow used herein refers to that a voltage is converted into a voltage exceeding a conversion voltage upper limit of the A/D conversion circuit 123 and the output value (pixel value) reaches 255.

If there is a plurality of reading conditions including the minimum resolution, a reading condition with the shortest line cycle is selected from the plurality of reading conditions including the minimum resolution.

The reason for the selection of the reading condition with the shortest line cycle is to prevent the adjusted light time from exceeding the lightable time (the longest time for which lighting is possible) of different reading conditions when the lighting time of the light source unit 22 is adjusted such that a pixel value does not overflow for the minimum resolution.

In addition, for example, if the lightable time for all line cycles is limited to be equal to the lightable time of the shortest line cycle, the shortest line cycle may not be necessarily selected. That is, in the first exemplary embodiment, since a line cycle is proportional to the lightable time, if the line cycle is not proportional to the lightable time in selecting the shortest line cycle, a line cycle with the shortest lightable time may be selected irrespective of the length of the line cycle.

In addition, for example, if the only reading conditions are "300 dpi, 4 msec" and "600 dpi, 2 msec," the CPU 101 selects "300 dpi, 4 msec" and again sets the lightable time as "2 msec." Accordingly, the shortest lightable time is set as the lightable time.

In addition, although the reading conditions shown in FIG. 3 can be selected by a user when the sheet is read, a reading condition with less resolution of, for example, 150 dpi may be prepared and selected for only the pre-processing. This can be equally applied to the shortest line cycle.

In S102, the CPU 101 performs a dark adjustment and stores an adjusted dark adjustment value in the EEPROM 104.

The term dark adjustment means that a sheet cover is closed to prevent external light from being incident onto a sheet table, the sheet is read by the reading device 21, and a minus reference voltage (black adjustment value) of the A/D conversion circuit 123 is adjusted such that the minimum one of pixel values output from the reading device 21 becomes 0 (zero).

In S103, the CPU 101 performs a light intensity adjustment using the minimum resolution selected in S101 and the shortest line cycle.

The light intensity adjustment used herein refers to a process of adjusting the light intensity adjustment value of the light source unit 22 for each color so that the maximum pixel value can become 254 (one example of a predetermined value) when the white reference plate 19 is read by turning the light source unit 22 on. The light intensity adjustment will be described in more detail later.

In S104, the CPU 101 selects one of different reading conditions other than the reading condition selected in S101.

In S105, the CPU 101 performs a brightness adjustment for the reading condition selected in S104. The brightness adjustment will be described in more detail later.

In S106, the CPU 101 determines whether or not all of the different reading conditions are selected. If it is determined that all of the different reading conditions are selected, the CPU 101 proceeds to S107. If any reading condition is not yet selected, the CPU 101 returns to S104 where the process is repeated until all reading conditions are selected.

In S107, the CPU 101 selects one of the reading conditions shown in FIG. 3 to generate a group of white reference values.

More specifically, for example, the CPU 101 selects one of the reading conditions including the maximum resolution. In the following description, a reading condition with the maximum resolution is referred to as a "white reference value generation reading condition."

In S108, the CPU 101 generates a group of white reference values (including the maximum resolution) for shading correction under the white reference value generation reading condition as follows.

First, the CPU 101 sets an AFE adjustment storage value of the white reference value generation reading condition in the AFE 122.

Next, the CPU 101 turns the light source unit 22 on using the light intensity adjustment value adjusted in S103 and repeats the reading of the white reference plate 19 by a predetermined number of times under the white reference value generation reading condition. An output value (voltage) output by the reading the white reference plate 19 is amplified based on the AFE adjustment storage value of the white reference value generation reading condition.

Next, the CPU 101 generates a white reference value for each light receiving element by averaging the output values (pixel values) output by the respective readings. A set of white reference values for the respective light receiving elements is just a group of white reference values of the white reference value generation reading condition. Next, the CPU 101 stores the group of white reference values of the white reference value generation reading condition in the EEPROM 104.

In S109, the CPU 101 turns the light source unit 22 off.

In S110, the CPU 101 generates a group of black reference values for shading correction under the white reference value generation reading condition as follows.

First, the CPU 101 sets an AFE adjustment storage value of the white reference value generation reading condition in the AFE 122.

Next, with the light source unit 22 turned off, the CPU 101 repeats the reading by a predetermined number of times under the white reference value generation reading condition.

Next, the CPU 101 generates a black reference value for each light receiving element by averaging the pixel values output by the respective readings. A set of black reference values for the respective light receiving elements is just a group of black reference values with the maximum resolution.

Next, the CPU 101 stores the group of black reference values of the white reference value generation reading condition in the EEPROM 104.

Alternatively, the black reference value may be generated by lighting the light source unit 22 on using the light intensity adjustment value adjusted in S103 and then reading a black reference member.

(6-1-2) Light Intensity Adjustment

Next, the light intensity adjustment performed in S103 will be described in more detail with reference to FIG. 7.

Figure 7:
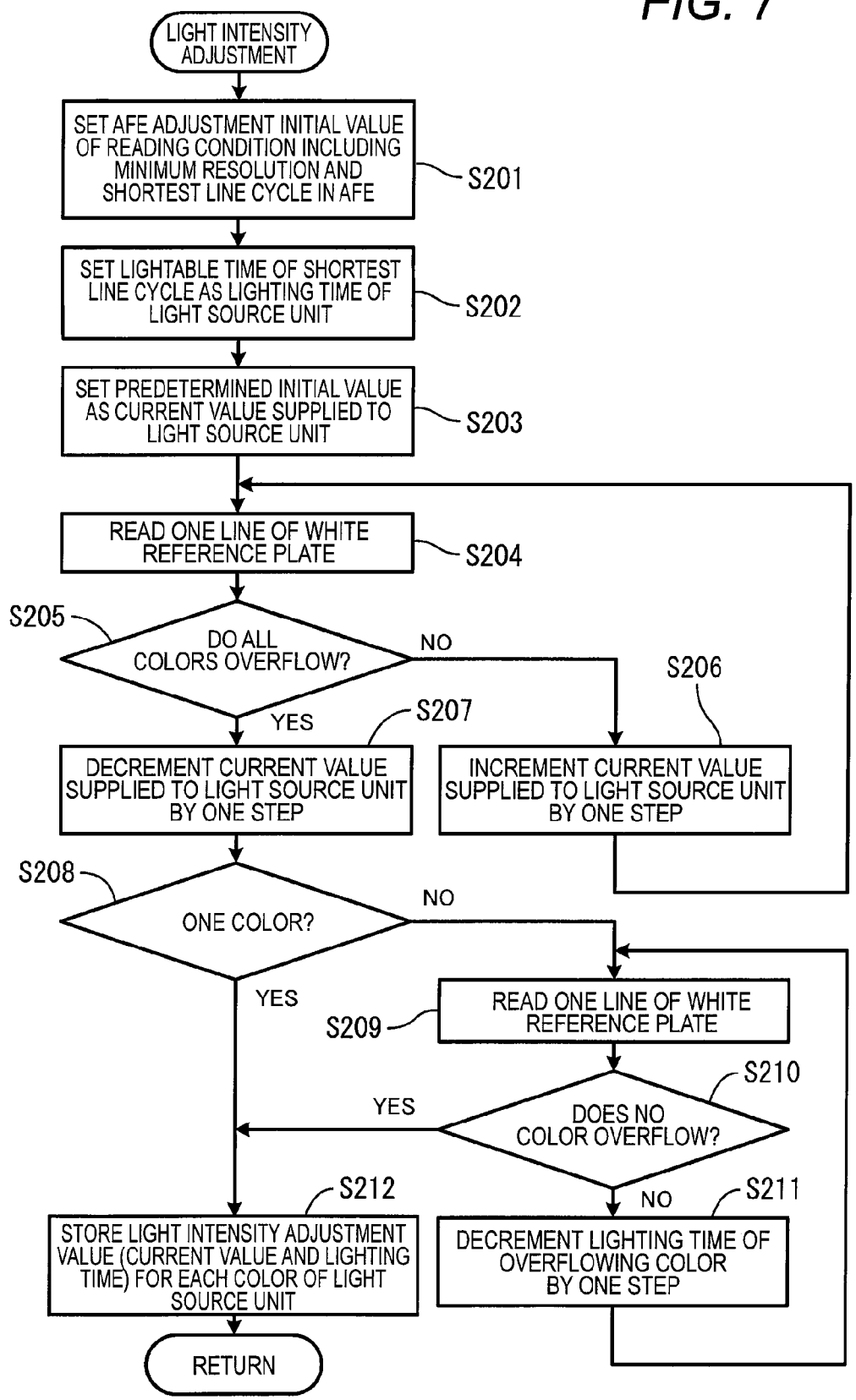
FIG. 7 is a flow chart for light intensity adjustment.

In FIG. 7, in S201, the CPU 101 sets an AFE amplification rate initial value of a reading condition including the minimum resolution selected in S101 and the shortest line cycle in the AFE 122. If the minimum resolution and the shortest line cycle do not belong to the same reading condition, it is assumed that an AFE amplification of the reading condition to which the minimum resolution belongs is set.

In S202, the CPU 101 sets the lightable time (the longest time for which lighting is possible) of the shortest line cycle selected in S101 as lighting time of the light source unit 22.

In S203, the CPU 101 sets a predetermined initial value as a current value supplied to the light source unit 22. The current initial value is set to be sufficiently small such that the maximum pixel value obtained when the white reference plate 19 is read by turning the light source unit 22 on at the lightable time set in S202 does not overflow (i.e., exceed 255).

In S204, the CPU 101 causes the reading device 21 to read one line of the white reference plate 19.

In S205, the CPU 101 determines whether or not the pixel values for the all the RGB colors overflow. More specifically, if at least one pixel value in a group of pixel values of one line for each color, which is output from the reading device 21, is equal to or more than 255, the CPU 101 determines that the color overflows. The CPU 101 proceeds to S206 if no color overflows and proceeds to S207 if all colors overflow.

In S206, the CPU 101 increments the current value supplied to the light source unit 22 by one step.

In S207, the CPU 101 decrements the current value supplied to the light source unit 22 by one step. By decrementing the current value by one step, at least one color of RGB, which overflowed last, returns to a state where no overflow occurs (a state immediately before an overflow occurs).

In S208, the CPU 101 determines whether the number of colors of the light source unit 22 is 3 or 1.

For example, the number of colors (multicolor/monochrome) may be set as a reading condition of the sheet, and in this case, it is preferable to generate groups of white reference values for multicolor and monochrome and store these groups in the EEPROM 104. In the first exemplary embodiment, in order to generate the group of white reference values for multicolor and the group of white reference values for monochrome, a light intensity adjustment is performed for 3 colors and one color. If the number of colors is 1, the sheet is read by, for example, lighting only the light source 22G on.

The CPU 101 proceeds to S209 if the number of colors is 3 and proceeds to S212 if the number of colors is 1.

In S209, the CPU 101 causes the reading device 21 to read one line of the white reference plate 19.

In S210, the CPU 101 determines whether or not all colors overflow (no overflow generation). The CPU 101 proceeds to S211 if any color overflows and proceeds to S212 if no color overflows.

In S211, the CPU 101 decrements lighting time of an overflowing color by one step.

In S212, the CPU 101 stores a light intensity adjustment value (current value and lighting time) of the light source unit 22 for each color in the EEPROM 104.

(6-1-3) Brightness Adjustment

Next, the brightness adjustment performed in S105 will be described in detail with reference to FIG. 8.

In S301, the CPU 101 sets an AFE amplification rate initial value of the reading condition selected in S104 in the AFE 122. The AFE amplification rate initial value is set to be sufficiently small such that the maximum pixel value obtained when the white reference plate 19 is read by turning the light source unit 22 on does not overflow (i.e., exceed 255).

In S302, the CPU 101 sets the light intensity adjustment value (current value and lighting time) stored in S212 as the light intensity adjustment value of the light source unit 22.

In S303, the CPU 101 causes the reading device 21 to read one line of the white reference plate 19 by turning the light source unit 22 on with the light intensity adjustment value set in S302.

In S304, the CPU 101 determines whether or not any color overflows. The CPU 101 proceeds to S305 if any color overflows and proceeds to S306 if no color overflows.

In S305, the CPU 101 increments an AFE amplification rate by one step. Since the light intensity has been previously adjusted, incrementing the AFE amplification rate one step by one step results in overflow of all colors.

In S306, the CPU 101 decrements an AFE amplification rate by one step. Since the light intensity has been previously adjusted, decrementing the AFE amplification rate one step by one step results in no overflow of all colors.

In S307, the CPU 101 stores the adjusted AFE amplification rate in the EEPROM 104, as an AFE amplification rate storage value of the selected reading condition.

(6-2) Sheet Reading Process

Next, the sheet reading process will be described in detail with reference to FIG. 9.

This process starts when a user manipulates the operation unit 130 to select a reading condition including a resolution equal to or lower than the resolution included in the white reference value generation reading condition and instruct a reading operation.

In the first exemplary embodiment, since the group of white reference values is generated with the maximum resolution, although the user may select any one of all the reading conditions, if the group of white reference values is generated with a resolution other than the maximum resolution, this process is performed when a reading condition including a resolution equal to or lower than the resolution, with which the group of white reference value is generated, is selected.

In S401, the CPU 101 determines a setting value such as a resolution, a line cycle or the like in response to the reading condition selected by the user.

In S402, the CPU 101 sets the dark adjustment value adjusted by the dark adjustment in S102 as a minus reference voltage of the A/D conversion circuit 123.

In S403, the CPU 101 sets the light intensity adjustment value stored in S212 as the light intensity adjustment value of the light source unit 22.

In S404, the CPU 101 sets an AFE amplification storage value of the reading condition selected by the user (hereinafter referred to as "corresponding reading condition").

In S405, the CPU 101 acquires a subtraction coefficient of the reading condition selected by the user.

In S406, the CPU 101 determines whether or not the subtraction coefficient is larger than 1. The CPU 101 proceeds to S407 if the subtraction coefficient is larger than 1 and proceeds to S409 if the subtraction coefficient is equal to or smaller than 1.

In S407, the CPU 101 reads a group of white reference values of the white reference generation reading condition from the EEPROM 104 and converts the read group of white reference values into a group of white reference values of the corresponding reading condition by averaging the read group of white reference values based on the subtraction coefficient.

Specifically, for example, if the maximum resolution is 1200 dpi and a resolution of the corresponding reading condition is 600 dpi, since the subtraction coefficient is 2 (=1200 dpi/600 dpi), the CPU 101 obtains a white reference value of one pixel of 600 dpi by obtaining an average on every two white reference values for the group of white reference values of the maximum resolution.

Alternatively, for example, the subtraction process may be performed by acquiring white reference values from the group of white reference values of the maximum resolution every one white reference value.

In S408, the CPU 101 converts a group of black reference values of the maximum resolution into a group of black reference values of the corresponding resolution by averaging the group of black reference values of the maximum resolution based on a subtraction coefficient in the same way as S407.

In S409, the CPU 101 turns the light source unit 22 on with the light intensity adjustment value set in S212 and causes the reading device 21 to read the sheet with the resolution and line cycle of the corresponding reading condition. At this time, an output value (voltage) output from the reading device 21 is amplified based on the AFE amplification storage value of the corresponding reading condition.

In S410, the CPU 101 performs a shading correction for the pixel value output from the reading device 21 by using the group of white reference values and the group of black reference values stored in the EEPROM 104 if the white reference generation reading condition is selected and by using the group of white reference values converted in S407 and the group of black reference values converted in S408 if a reading condition (including a resolution lower than the resolution included in the white reference generation reading condition) other than the white reference generation reading condition is selected.

As described above, in the image scanner 1 according to the first exemplary embodiment, the luminosity and lighting time of the light source unit, which are adjusted with one resolution, are also used for reading for a different resolution. Further, white reference values are prepared under one of a plurality of resolutions, and white reference values of a different resolution equal to or lower than the one resolution are obtained by converting the white reference values based on a correlation between the resolution with which the white reference values are generated and the different resolution. Thus, there is no need to adjust the light intensity for each resolution to obtain white reference values corresponding the adjusted light intensity. Therefore, it is possible to reduce the waiting time before starting the reading operation compared to the related art.

In addition, the image scanner 1 stores the luminosity and lighting time adjusted for one resolution (minimum resolution) and the group of white reference values (the group of white reference values generated with the maximum resolution) generated by the white reference value generating unit. Thus, it is not necessary to store the luminosity, lighting time and group of white reference values adjusted for each resolution. Therefore, the memory capacity can be reduced.

In addition, according to the image scanner 1, by subtracting or averaging a group of white reference values according to a resolution ratio of a resolution (maximum resolution) when the group of white reference values to a resolution (one resolution) when the sheet is read, the group of white reference values is converted into a group of white reference values of the one resolution. The number of white reference values generated with the maximum resolution increases over the number of white reference values when the group of white reference values is generated with a different resolution. Thus, it is possible to simply obtain the group of white reference values of the different resolution by subtracting or averaging the group of white reference values (the group of white reference values stored in the white reference value storing unit) generated with the maximum resolution.

In addition, according to the image scanner 1, since a conversion parameter is adjusted such that a voltage output from the reading device 21 is converted to a predetermined value by the converting unit 124. Therefore, even if a level of voltage output for each resolution is varied as in a reading device such as CIS or the like, it is possible to properly convert a plurality of resolutions for any case.

In addition, according to the image scanner 1, since the light intensity of the light source unit 22 is adjusted by turning the light source unit 22 on under the reading condition giving the highest voltage output by the reading device 21 (the reading condition including the minimum resolution in the first exemplary embodiment). Therefore, it is possible to prevent a pixel value from being saturated when a reading operation is performed with the maximum resolution.

In addition, with the image scanner 1, since the shortest lightable time of a plurality of reading conditions is again set as the lightable time for one of the plurality of reading conditions and the light intensity of the light source unit 22 is adjusted under the again-set lightable time, as long as the lighting time is equal to or less than the shortest lightable time, even though the lightable time is varied for each reading condition, it is possible to cope with different long lightable times.

In addition, the image scanner 1 stores the luminosity and lighting time that are adjusted when the luminosity and lighting time of the light source unit 22 and white reference values are likely to be varied with time (i.e., at least some of when an image forming apparatus is powered on, when a predetermined period of time elapses after the light intensity of the light source unit 22 is adjusted by the light intensity adjusting unit, and when the image scanner 1 reads the predetermined number of sheets or more) and the group of white reference values of the reading condition including the maximum resolution. Therefore, it is possible to reduce the time taken until a reading operation actually starts after an instruction to start the reading operation is received, as compared to a case where a group of white reference values is acquired by adjusting the light source unit 22 before reading a sheet.

(Second Exemplary Embodiment)

Figure 11:
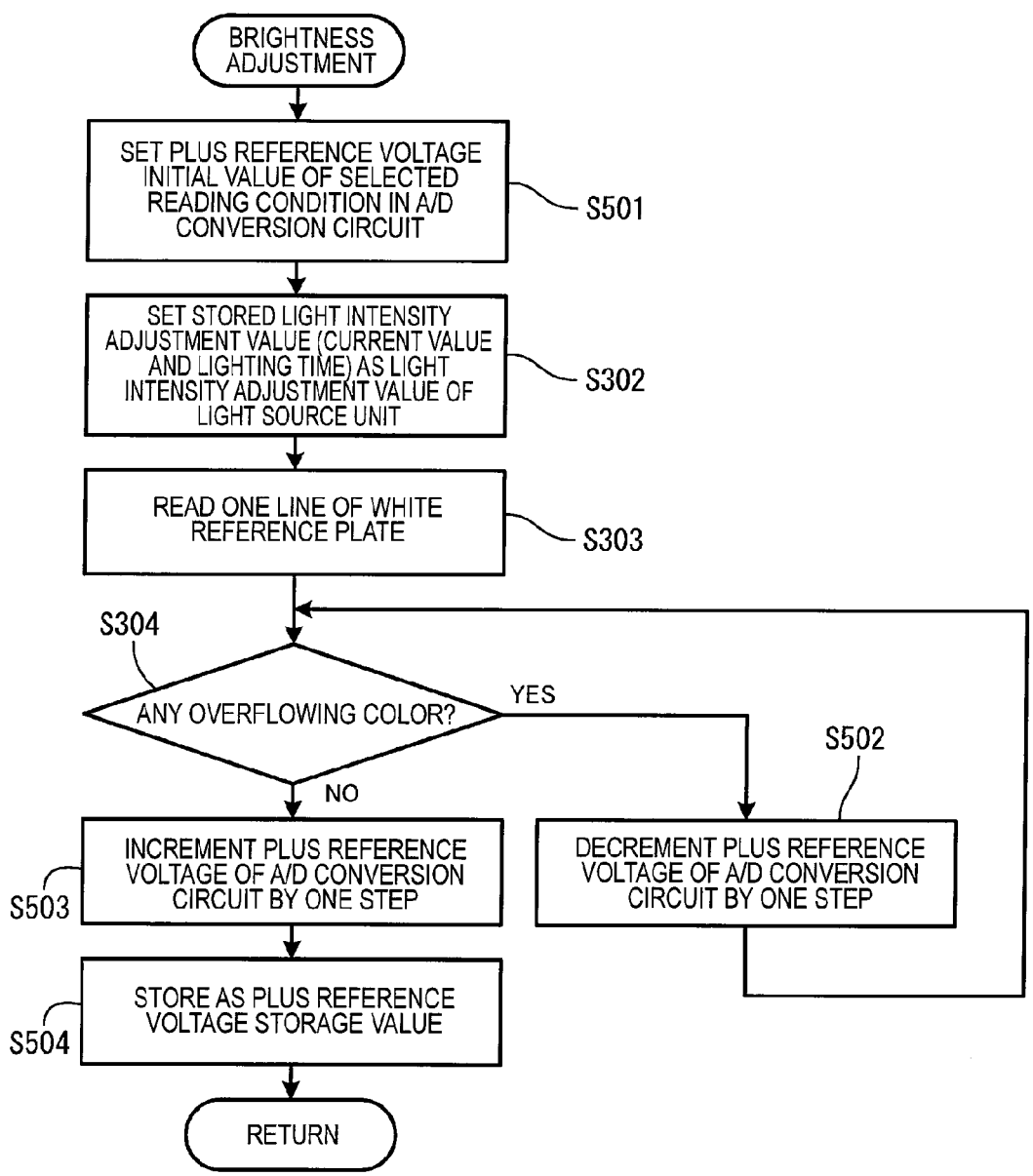
FIG. 11 is a flow chart for brightness adjustment according to the second exemplary embodiment.

Referring to FIGS. 10 and 11, a second exemplary embodiment of the present invention will be described. In the second exemplary embodiment, instead of adjusting an AFE amplification rate by means of the gain adjustment circuit 122, brightness is adjusted by adjusting a plus reference voltage (one example of a conversion parameter) of the A/D conversion circuit 123.

As shown in FIG. 10, a "plus reference voltage initial value" is set instead of the "AFE amplification rate" of the first exemplary embodiment and a "plus reference voltage storage value" is stored instead of the "AFE amplification rate storage value."

In addition, as reading conditions related to the second exemplary embodiment, in addition to the "subtraction coefficient of the first exemplary embodiment, an "output level conversion coefficient" for converting and absorbing a difference between levels of output voltages of an image sensor is stored. In addition, the subtraction coefficient for conversion into the number of pixels for each resolution does not have the same value as the output level conversion coefficient, but is determined depending on the level of output voltage of the image sensor.

Figure 8:
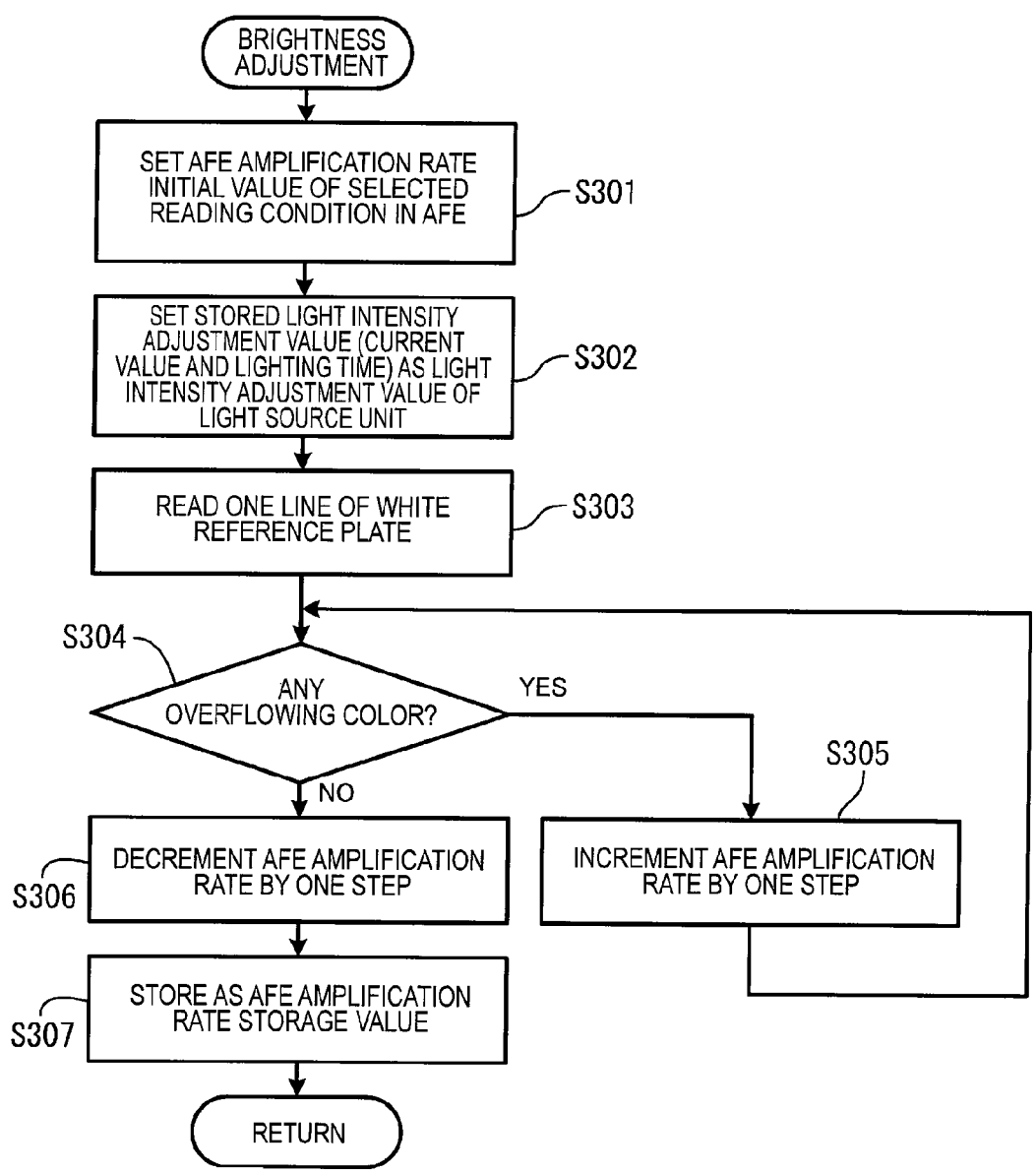
FIG. 8 is a flow chart for brightness adjustment.

In FIG. 11, the substantially same steps as the flow chart shown in FIG. 8 are denoted by the same reference numerals, and explanation thereof will be omitted.

In S501, the CPU 101 sets a plus reference voltage initial value of the reading condition selected in S104 in the A/D conversion circuit 123.

In S502, the CPU 101 increments a plus reference voltage of the A/D conversion circuit 123 by one step.

In S503, the plus reference voltage is decremented by one step.

In S504, the CPU 101 stores the adjusted plus reference voltage in the EEPROM 104, as a plus reference voltage storage value.

Figure 9:
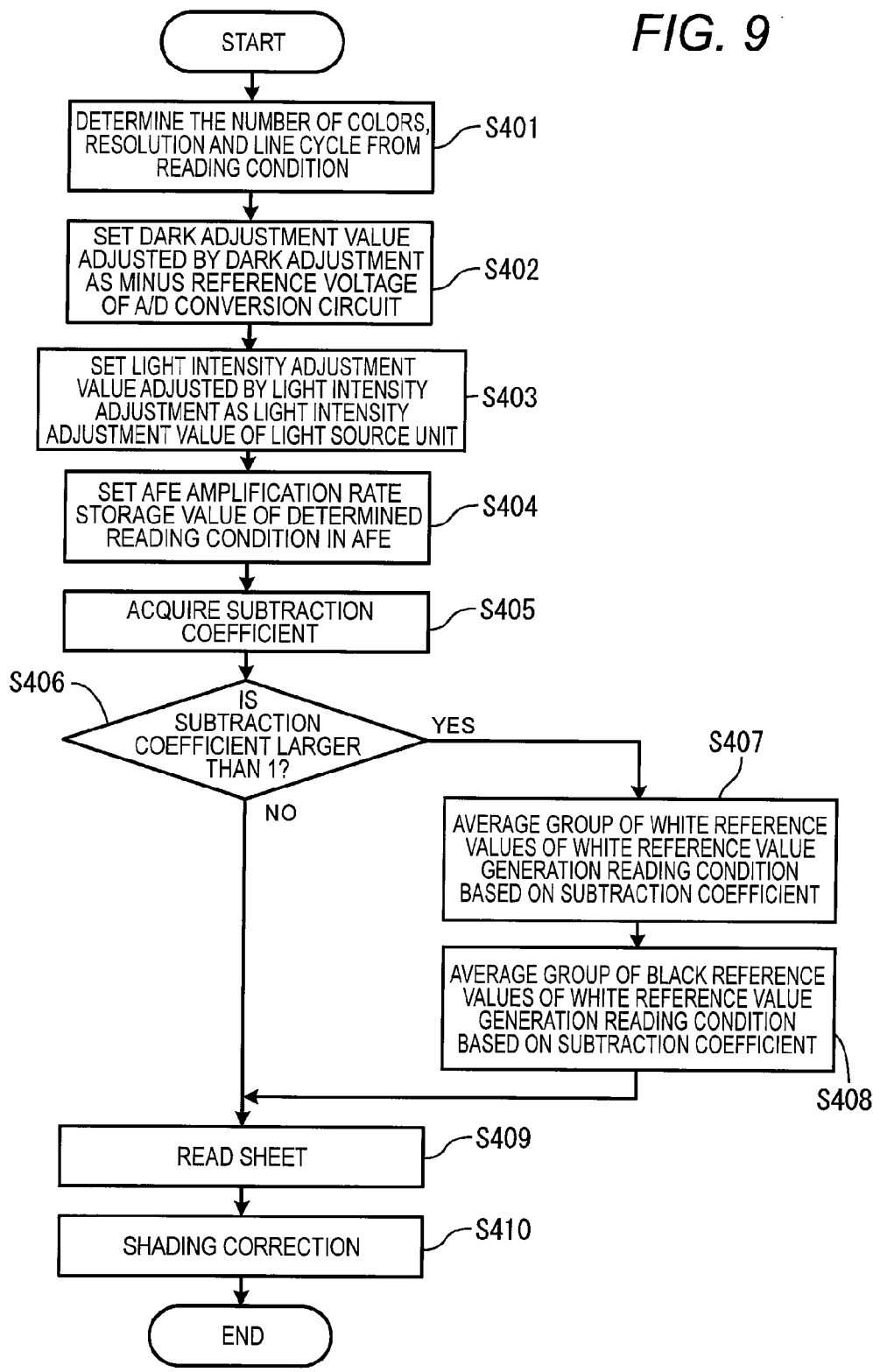
FIG. 9 is a flow chart for sheet reading process.

A sheet reading process related to the second exemplary embodiment has substantially the same configuration as the sheet reading process related to the first exemplary embodiment except that the plus reference voltage storage value in S404 of FIG. 9 is set in the A/D conversion circuit 123. Therefore, detailed explanation thereof will be omitted.

The image scanner 2 according to the second exemplary embodiment adjusts the plus reference voltage of the A/D conversion circuit 123 with the conversion parameter. Therefore, even if a level of voltage output for each resolution is varied, it is possible to properly convert a plurality of resolutions for any case.

(Third Exemplary Embodiment)

Figure 12:
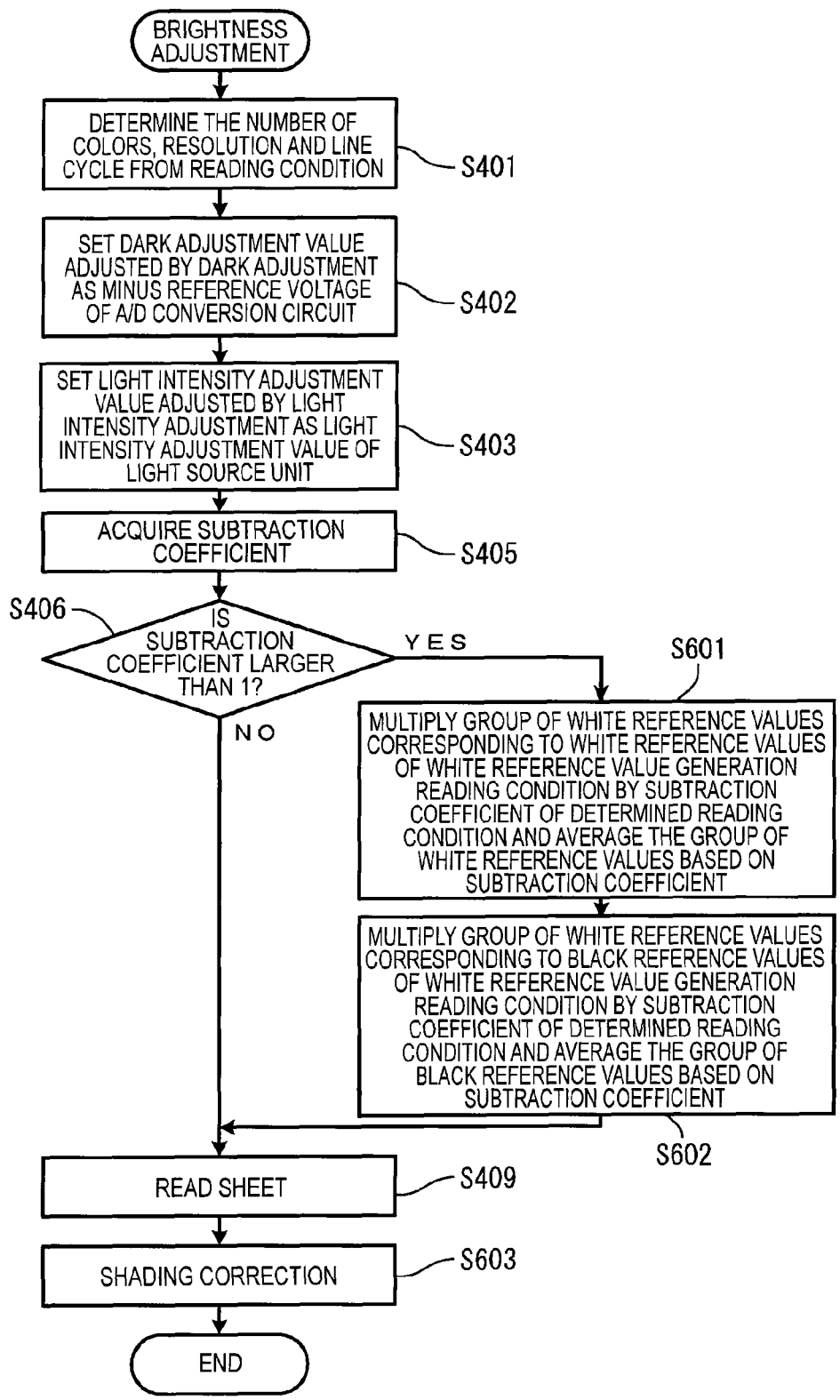
FIG. 12 is a flow chart for a sheet reading process according to a third exemplary embodiment.

Referring to FIG. 12, a third exemplary embodiment of the present invention will be described.

The third exemplary embodiment shows a case where the above-described brightness adjustment is not performed.

The image scanner according to the third exemplary embodiment has substantially the same electrical configuration as the image scanner 2 of the second exemplary embodiment except that the A/D conversion circuit has a high resolution. While the A/D conversion circuit 123 of the second exemplary embodiment has the ability to resolve a voltage range into 8 bits (0 to 255), the A/D conversion circuit of the third exemplary embodiment has the ability to resolve the same voltage range into, for example, 16 bits (0 to 65535).

If the A/D conversion circuit has a high resolution, assuming that a light intensity adjustment value of the light source unit 22 is adjusted such that the maximum pixel value output by reading the white reference plate 19 with 300 dpi (minimum resolution) reaches 65535, when the sheet is read with the same light intensity adjustment value for a different resolution, a difference between a black reference value and a white reference value exceeds 255 without adjusting the plus reference voltage.

For example, although a voltage output from the reading device 21 for 1200 dpi is about ¼ of that for 300 dpi, since the outputtable maximum pixel value reaches 16384 (=65535/4) or so without adjusting the plus reference voltage even in that case, the difference between the black reference value and the white reference value sufficiently exceeds 255.

When the outputtable maximum pixel value exceeds 255, a pixel value can be properly converted into a gray scale range from 0 to 255.

For example, illustrating the A/D conversion circuit related to the second exemplary embodiment as a comparative example, the maximum pixel value that can be output for 1200 dpi is about 64 (1255/4). Such maximum pixel value is much smaller than 255. In this case, assuming that a gray scale range of 0 to 64 (a narrower range) is converted into a gray scale range of 0 to 255 (a wider range) by simply quadrupling the output pixel value simply, only pixel values skipped at intervals of three, such as 120, 124, 128, . . . , can be obtained, which cannot be said to be properly converted into the gray scale range of 0 to 255. To avoid this, in the second exemplary embodiment, an adjustment is performed with an analog level (a level of voltage) by adjusting the plus reference voltage.

On the contrary, for example, assuming that the maximum pixel value which can be output for 1200 dpi is 16000, since a gray scale range of 0 to 16000 (a wider range) is converted into a gray scale range of 0 to 255 (a narrower range), pixel values will not be skipped. Accordingly, a gray scale range can be properly converted without performing an adjustment to the analog level.

A pre-processing related to the third exemplary embodiment is substantially the same as that of the first exemplary embodiment except that the third exemplary embodiment excludes the brightness adjustment from the flow chart shown in FIG. 6.

FIG. 12 is a flow chart of a sheet reading process for reading a sheet, according to the third exemplary embodiment. In this figure, the substantially same steps as the flow chart shown in FIG. 9 are denoted by the same reference numerals. Therefore, explanation thereof will be omitted.

In S601 (one example of a white reference converting unit), the CPU 101 multiplies a group of white reference values of the maximum resolution (1200 dpi) by an output level conversion coefficient of a selected resolution and converts the group of white reference values of the maximum resolution into a group of white reference values of the selected resolution by subtracting the group of white reference values of the maximum resolution based on a subtraction coefficient.

The multiplication by the output level conversion coefficient of the selected resolution is for matching a range of values which can be taken by white reference values (for example, 0 to 16384 if a group of white reference values is generated with 1200 dpi) to a range of values which can be taken by pixel values read with the selected resolution (for example, 0 to 65535 if 300 dpi is selected). If the range of values which can be taken by the white reference values does not match the range of values which can be taken by the read pixel values, this is because, even if shading correction is performed, correction is not made so that the maximum pixel value (corresponding to a pixel value obtained when the white reference plate 19 is read) reaches an upper limit of a gray scale range (0 to 255 in the third exemplary embodiment).

The multiplication by the output level conversion coefficient will not change a distribution shape of the white reference values although the white reference values are changed. In other words, in spite of the multiplication by the output level conversion coefficient, the group of white reference values continues to reflect non-uniformity of sensitivity between light receiving elements at the time when the group of white reference values is generated. Accordingly, a shading correction can be performed with high precision using the group of white reference values multiplied by a subtraction coefficient as long as the white reference values are the white reference values obtained by reading the sheet with the same light intensity adjustment value as when the group of white reference values was generated.

In S602, the CPU 101 multiplies a group of black reference values of the maximum resolution by the output level conversion coefficient of the selected resolution and converts the group of black reference values of the maximum resolution into a group of black reference values of the selected resolution by subtracting the group of black reference values of the maximum resolution based on a subtraction coefficient.

In S603, the CPU 101 performs a shading correction for a pixel value output from the reading device 21 by using the group of white reference values and the group of black reference values stored in the EEPROM 104 if the white reference generation reading condition is selected and by using the group of white reference values converted in S601 and the group of black reference values converted in S602 if a reading condition (including a resolution lower than the resolution included in the white reference generation reading condition) other than the white reference generation reading condition is selected.

The following equation 1 is one example of a correction equation used for the shading correction.

$$\text{Pixel value after correction} = \{\text{pixel value before correction} - \text{black reference value}\}/(\text{white reference value} - \text{black reference value})\} \times 255 \quad \text{(Equation 1)}$$

For example, assume that a white reference value and a black reference value of a light receiving element are 16000 and 500, respectively. In addition, assume that a pixel value output by reading a sheet with 1200 dpi is 7750. 7750 is a middle value between 500 and 16000. In this case, according to Equation 1, 7750 is corrected to 128, i.e., a middle value of a gray scale range from 0 to 255.

That is, a process of converting a pixel value output in a gray scale range of 500 to 16000 into a pixel value of a gray scale range of 0 to 255 and a process of correcting an effect due to the non-uniformity of sensitivity of light receiving elements are performed together according to Equation 1.

According to the image scanner of the third exemplary embodiment, even if a level of voltage output for each resolution is varied, it is possible to properly convert the voltage for any one of a plurality of resolutions.

Incidentally, the image scanner related to the third exemplary embodiment may include an AFE. In such a case, an AFE amplification will not be adjusted for each resolution.

(Fourth Exemplary Embodiment)

Referring to FIGS. 13A to 13C, a fourth exemplary embodiment of the present invention will be described.

In the fourth exemplary embodiment, reading conditions are divided into a plurality of groups and the light intensity and lighting time of the light source unit 22 are adjusted under one reading condition in each of the groups.

Group 1 shown in FIG. 13A is one example of grouping of the reading conditions. In group 1, "1 msec, 300 dpi" is grouped as group A, "2 msec, 300 dpi" and "2 msec, 600 dpi" as group B, and "4 msec, 600 dpi" and "6 msec, 1200 dpi" as group C.

In the example of group 1 shown in FIG. 13A, those having similar line cycles other than similar resolutions are preferentially grouped, and, as a result, "2 msec, 300 dpi" and "2 msec, 600 dpi" are classified into the same group.

In the grouping, it is not preferable to group those having greatly different line cycles into the same group. This is because an image on a sheet cannot be read by the extent of movement in a sub scan direction when the light source is turned-off if the light source turning-on time is greatly shorter than a line cycle.

A pre-processing and a sheet reading process related to the fourth exemplary embodiment are substantially the same as the first exemplary embodiment except that these processes are performed in the unit of group. Therefore, only an outline thereof will be described below.

First, the CPU 101 turns the light source unit 22 on with a light intensity adjustment value for each of the above-described groups and generates groups of white reference values under reading conditions including the maximum resolution in the groups. Specifically, groups of white reference values are generated for circled reading conditions: "1 msec, 300 dpi," "2 msec, 600 dpi" and "6 msec, 1200 dpi," in FIG. 13A.

Next, the CPU 101 stores the light intensity and lighting time adjusted by the light intensity adjusting unit for each group and the groups of white reference values including the maximum resolution in the groups.

Next, the CPU 101 reads a sheet under a selected reading condition by turning the light source unit 22 on with a light intensity adjustment value of a group to which the selected reading condition belongs. In addition, if the selected reading condition is a reading condition including the maximum resolution of a group to which the selected reading condition belongs, the stored group of white reference values of the group is used. In addition, if the selected reading condition is a reading condition other the reading condition including the maximum resolution, a shading correction is performed using a group of white reference values into which the group of white reference values is converted based on a correlation.

With the above-described group 1, as groups having relatively similar line cycles share the light intensity and lighting time of the light source unit 22, it is possible to read the sheet with higher precision.

Group 2 shown in FIG. 13A is an example of preferentially grouping those having similar resolutions other than similar line cycles. As a result, "1 msec, 300 dpi" and "2 msec, 300 dpi" are grouped as group A, and "2 msec, 600 dpi" and "4 msec, 600 dpi" as group B, and "6 msec, 1200 dpi" as group C.

Group 2 has the same resolution in the groups. In this case, groups of white reference values are generated under reading conditions having the minimum lightable time in the groups.

Group 3 shown in FIG. 13B is an example of grouping in which gray scales are added to reading conditions. A gray scale refers to the number of binary bits expressing a pixel value. 8 bits and 16 bits mean the expression of 256 gray scales of 0 to 255 and 65536 gray scales of 0 to 65535, respectively.

Group 3 groups reading conditions having the same resolution. In addition, for group 3, groups of white reference values are generated under a reading condition having the greatest gray scale in the groups. In addition, by extracting the upper 8 bits from the group of white reference values generated under the reading condition of 16 bits of the greatest gray scale, the group of white reference values is converted into a group of white reference values of a different reading condition, and a shading correction can be performed using the converted group of white reference values. A relationship between 16 bits and 8 bits is a correlation in group 3.

Group 4 shown in FIG. 13C is an example of grouping in which "monochrome/multicolor" is added to the reading conditions. Group 4 groups reading conditions having the same resolution. For example, "monochrome, 1 msec, 300 dpi" and "multicolor, 3 msec, 300 dpi" are grouped as the same group. Since a line cycle for monochrome is ⅓ of a line cycle for multicolor, resolutions and line cycles per one color become equal in the same group.

For group 4, groups of white reference values are generated under a multicolor reading condition of the reading conditions in the groups. In addition, for reading under a monochrome reading condition, a shading correction is performed using a group of white reference values for G (green). The relationship between the multicolor and the monochrome is a correlation in group 3.

Group 5 shown in FIG. 13C is also an example of grouping in which "monochrome/multicolor" is added to reading conditions.

Group 5 groups reading conditions having the same monochrome/multicolor. In addition, for example, for reading under a reading condition of 300 dpi, the CPU 101 converts white reference values of 600 dpi into white reference values of 300 dpi by averaging or subtracting the white reference values of 600 dpi. In addition, for example, for conversion into 1200 dpi, the CPU 101 converts white reference values, which are insufficient by a linear interpolation, into white reference values of 1200 dpi by supplementing the white reference values which are insufficient by the linear interpolation.

Incidentally, for group 5, a group of white reference values may be generated under a reading condition of the maximum resolution as in the first to third exemplary embodiments.

The image scanner according to the fourth exemplary embodiment groups reading conditions from a point of view that setting values of reading conditions that are common or close to each other and generates a group of white reference values for each group. If the setting values are common or close to each other, the conditions for generating groups of white reference values become close to each other. Therefore, it is possible to further improve shading correction precision, as compared to a case where a group of white reference values generated under one reading condition is applied to all reading conditions.

(Modification to Exemplary Embodiments)

The present invention is not limited to the above-described exemplary embodiments. For example, the technical scope of the present invention encompasses the following embodiments.

In the above-described exemplary embodiments, the light intensity is adjusted under reading conditions including the minimum resolution. However, the reading conditions used may not be necessarily the reading conditions including the minimum resolutions as long as they are reading conditions giving the highest voltage output by the reading device 21 when the light source unit 22 emits light of the same light intensity under a plurality of reading conditions.

In the above-described exemplary embodiments, a reading condition including the maximum resolution of a plurality of reading conditions is used as the white reference value generation reading condition. Alternatively, if white reference values are utilized between several reading conditions, but not all of the plurality of reading conditions, a reading condition including the maximum resolution of the several reading conditions may be the white reference value generation reading condition.

In the above-described exemplary embodiments, the image reading apparatus has been described with the image scanner. Alternatively, illustrative aspects of the present invention may be applied to a multi-function device having a copy function of reading and printing a sheet, a scanner function of reading the sheet and generating image data, a facsimile function of reading the sheet for facsimile transmission, etc.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image reading apparatus that reads an image of a sheet under one of a plurality of reading conditions, the image reading apparatus comprising:
   a reference member;
   a light source unit that emits light to the sheet or the reference member;
   a reading unit that outputs an output value based on reflection light from the sheet or the reference member;
   a light intensity adjusting unit that adjusts at least one of luminosity and lighting time of the light source unit such that the output value from the reading unit reaches a predetermined value;
   a white reference value generating unit that generates a group of white reference values based on the output value from the reading unit under one of the plurality of reading conditions in a state where the light source unit is turned on with the luminosity and lighting time adjusted by the light intensity adjusting unit;
   a white reference value storing unit that stores the group of white reference values generated by the white reference value generating unit and the luminosity and lighting time adjusted by the light intensity adjusting unit;
   a white reference value converting unit that converts the group of white reference values stored in the white reference value storing unit into a group of white reference values of a different reading condition based on a correlation between the reading condition under which the group of white reference values is generated by the white reference value generating unit and the different reading condition;
   a sheet reading control unit that controls the reading unit to read the sheet while turning the light source unit on with the luminosity and lighting time stored in the white reference value storing unit when the image of the sheet is read under the one of the plurality of reading conditions; and
   a shading correcting unit that performs a shading correction for the output value output from the reading unit,
   wherein, if the one reading condition is the reading condition with which the group of white reference values is generated, the shading correcting unit performs the shading correction by using the group of white reference values that are stored in the white reference value storing unit, and
   wherein, if the one reading condition is a reading condition other than the reading condition with which the group of white reference values is generated, the shading correcting unit performs the shading correction by using the group of white reference values that are converted by the white reference value converting unit.

2. The image reading apparatus according to claim 1,
   wherein the image reading apparatus reads the image of the sheet under one of the plurality of reading conditions,
   wherein the image reading apparatus further comprises a group dividing unit that divides the plurality of reading conditions into groups,
   wherein the light intensity adjusting unit adjusts the luminosity and lighting time of the light source unit for each of the groups under one reading condition of the group,
   wherein the white reference value generating unit generates the group of white reference values for each of the groups under one reading condition of the group,
   wherein the white reference value storing unit stores the luminosity and lighting time adjusted by the light intensity adjusting unit and the group of white reference values for each of the groups,
   wherein, when the sheet is read under the one reading condition, the sheet reading control unit controls the sheet to be read by turning the light source unit on with the luminosity and lighting time of a group to which the one reading condition belongs,
   wherein, if the one reading condition is the reading condition which generates the group of white reference values of the group to which the one reading condition belongs, the shading correcting unit performs the shading correction by using a group of white reference values of the group stored in the white reference value storing unit, and
   wherein, if the one reading condition is a reading condition other than the reading condition which generates the group of white reference values is generated of the group to which the one reading condition belongs, the shading correcting unit performs the shading correction by using a group of white reference values into which the group of white reference values of the group is converted by the white reference value converting unit.

3. The image reading apparatus according to claim 1,
   wherein the reading conditions comprise at least one of resolution, lightable time of the light source unit, gray scale information that corresponds to a level of output of the reading unit, and a condition regarding whether reading is performed in multicolor or monochrome, and
   wherein the white reference value converting unit performs a conversion operation based on a correlation between the reading condition under which the group of white reference values is generated by the white reference value generating unit and the different reading condition.

4. The image reading apparatus according to claim 3,
   wherein the white reference value converting unit converts the group of white reference values of one resolution by subtracting or averaging the group of white reference values stored in the white reference value storing unit according to a resolution ratio of a resolution, which is a reading condition when the group of white reference values is generated, to a resolution, which is a reading condition when the sheet is read by the sheet reading control unit, and
   wherein the sheet reading unit controls the reading unit to read the image of the sheet with the one resolution equal to or lower than the resolution with which the group of white reference values is generated by the white reference value generating unit of the plurality of reading conditions.

5. The image reading apparatus according to claim 1,
wherein the reading unit includes a converting unit that converts a voltage output based on the reflection light into an output value based on a conversion parameter,
wherein the light intensity adjusting unit performs an adjustment under one of the plurality of reading conditions,
wherein the image reading apparatus further comprises:
- a conversion parameter adjusting unit that adjusts the conversion parameter, the conversion parameter adjusting unit causing the reading unit to read the reference member by turning the light source unit on with the light intensity and lighting time adjusted by the light intensity adjusting unit under different reading conditions other than the reading condition in the adjustment by the light intensity adjusting unit so as to adjust the conversion parameter such that the output value converted by the converting unit reaches the predetermined value; and
- a conversion parameter storing unit that stores the conversion parameter adjusted by the conversion parameter adjusting unit for each of the reading conditions, wherein the white reference value generating unit causes the converting unit to convert a voltage using the conversion parameter according to the reading condition under which the group of white reference values is generated, and
wherein the sheet reading control unit controls the converting unit to convert a voltage using the conversion parameter according to the one reading condition when the sheet is read under the one reading condition.

6. The image reading apparatus according to claim 5,
wherein the converting unit comprises:
- an amplifying unit that amplifies the output voltage; and
- an A/D converting unit that converts the voltage amplified by the amplifying unit into an output value, and
wherein the conversion parameter is an amplification rate by which the voltage is amplified by the amplifying unit.

7. The image reading apparatus according to claim 5,
wherein the converting unit comprises a reference voltage varying unit, which varies a reference voltage when the output voltage is converted, and which converts the output voltage into an output value based on the reference voltage varied by the reference voltage varying unit, and
wherein the conversion parameter adjusting unit adjusts the reference voltage with the conversion parameter.

8. The image reading apparatus according to claim 5,
wherein the white reference value converting unit is configured to:
obtain a resolution ratio by dividing a resolution included in the reading condition under which the group of white reference values is generated by a resolution included in the one reading condition;
multiply the group of white reference values stored in the white reference value storing unit by the obtained resolution; and
convert the group of white reference values stored in the white reference value storing unit into a group of white reference values of the one reading condition by subtracting or averaging the multiplied group of white reference values.

9. The image reading apparatus according to claim 1,
wherein the light intensity adjusting unit adjusts the luminosity and lighting time of the light source unit under a reading condition giving the output voltage having the maximum value when the light source unit emits light with the same luminosity and lighting time under the plurality of reading conditions.

10. The image reading apparatus according to claim 1,
wherein the light intensity adjusting unit adjusts the luminosity and lighting time of the light source unit under the minimum resolution of the plurality of reading conditions.

11. The image reading apparatus according to claim 1,
wherein the image reading apparatus reads the image of the sheet under one of the plurality of reading conditions including lightable time of the light source unit, and
wherein the light intensity adjusting unit again sets the shortest lightable time of the plurality of reading conditions as lightable time of one of the plurality of reading conditions and adjusts the lighting time under the again set lightable time.

12. The image reading apparatus according to claim 1,
wherein the light intensity adjusting unit adjusts the luminosity and lighting time at a timing, wherein the timing comprises at least one of: a timing when an image forming apparatus is powered on; a timing when a predetermined period of time elapses after the light intensity of the light source unit is previously adjusted; a timing when the image reading apparatus reads a predetermined number of sheets or more; and a timing when the current temperature is outside a certain range as compared to the temperature of the light source unit when the light intensity is adjusted,
wherein the white reference value generating unit prepares a group of white reference values of the white reference value generation reading condition, and
wherein the white reference value storing unit stores the group of white reference values generated by the white reference value generating unit and the luminosity and lighting time adjusted by the light intensity adjusting unit.

13. The image reading apparatus according to claim 1, further comprising:
an operation unit that allows a user to select the one reading condition from the plurality of reading conditions.

\* \* \* \* \*